2,798,103
Patented July 2, 1957

2,798,103

SEPARATION OF AROMATIC COMPOUNDS BY CLATHRATE FORMATION WITH A WERNER COMPLEX

William D. Schaeffer, Ontario, and John D. Wordie, Fullerton, Calif., assignors to Union Oil Company of California, Los Angeles, Calif., a corporation of California No Drawing. Application July 20, 1953,
Serial No. 369,216

17 Claims. (Cl. 260—674)

This invention relates to methods for separating organic compounds which differ in molecular configuration, particularly compounds which have similar chemical and physical properties, and are therefore difficultly separable by conventional methods such as fractional distillation or crystallization. Broadly stated, the method consists in selectively absorbing one or more components of the feed mixture into a solid Werner-type complex of a metal salt and a basic nitrogen compound, and thereafter recovering the absorbed component from the complex by any of several procedures described hereinafter. The process may be designated broadly as extractive crystallization, or selective "clathration."

More specifically, the method of clathration contemplated herein involves the use in the clathration step of a stoichiometric excess of a basic nitrogen compound which is the same as, or similar to, the nitrogen base component of the Werner complex. It has been found that by employing an excess of nitrogen base, over and above the stoichiometric proportion necessary for the chemical make-up of the active Werner complex employed, a substantial improvement is obtained in the weight-for-weight capacity of the complex for absorbing the more readily clathratable components of the feed mixture. Moreover, in many cases where a solvent is employed in the clathration step, or in the recovery step, a more favorable solubility relationship is obtained whereby smaller volumes of solvent are required. In some cases the selectivity of the clathrate-former is also improved.

It is therefore a principal object of this invention to improve the separation of organic compounds by selective clathration thereof with Werner complexes by increasing the capacity of the complexes for the clathratable components in the feed mixture, reducing the solvent requirements, increasing the selectivity, all of which factors tend to reduce expenses by decreasing the initial cost of materials, increasing the permissible throughput of feed per unit of plant equipment, decreasing the heat requirements and the volume of materials to be handled. These and other objects and advantages are achieved by the procedures hereinafter described and claimed.

The Werner type complexes employed herein are made up of at least three components. The fundamental unit is a metal having an atomic number above 12 which is capable of forming coordinate complexes of the Werner type. This includes primarily the metals of groups IB, IIB, VIB, and VIII of the periodic table, such for example as iron, cobalt, nickel, copper, zinc, cadmium, silver, manganese, chromium, mercury, and molybdenum. Aluminum may also be used in some instances. A preferred class of metals consists of those in groups VIIB and VIII, and especially those having atomic numbers of 25 to 28 inclusive.

The second component of the complex consists of one or more basic nitrogen compounds, which are bound to the central metal atom through coordinate bonds. The operative complexes are mainly of the tetra- and hexa-coordinate types, wherein the metal atom is coordinated with four or six molecules of the basic nitrogen compound to form a positive radical which is usually divalent. Examples of suitable nitrogen compounds are set forth hereinbelow.

The positive radical (metal+nitrogen base) is in turn combined with a suitable negative radical, such for example as thiocyanate —SCN, isothiocyanate —NCS, azide —NNN, cyanate —OCN, isocyanate —NCO, cyanide —CN, sulfate =SO$_4$, nitrate —NO$_3$, nitrite —NO$_2$, chloride —Cl, bromide —Br, iodide —I, phosphate ≡PO$_4$. A group of negative radicals found to be particularly effective for the present purposes consists of the monovalent radicals thiocyanate, isothiocyanate, azide, cyanate, isocyanate, cyanide and nitrite. However, any radical may be utilized which is capable of producing a crystalline complex with the above positive radical, which complex will exhibit the desired selectivity for the particular isomer or compound which is to be absorbed. Similar complexes are described generally in Modern Aspects of Inorganic Chemistry, Emeleus and Anderson, 79–178, Van Nostrand Co., 1946, and also in Textbook of Inorganic Chemistry, vol. X, M. M. J. Sutherland, J. P. Lippincott Co., 1928. These references also describe general methods which may be employed for preparing the particular complexes employed herein.

The complexes concerned herein may be designated by the following general formula:

$$[X \cdot Z_y \cdot A_n] \quad (1)$$

wherein X is the metal atom as defined above, Z is the basic nitrogen compound, $y$ is a number from 2 to 6, A is the negative radical as above defined, and $n$ is a number from 1 to 3.

The basic nitrogen compounds employed in the above formula should be such as to give a maximum selective absorption for the particular isomer which is to be absorbed into the crystal lattice of the complex. For example, if it is desired to absorb p-xylene, a very suitable nitrogen compound is gamma-picoline. 4-ethylpyridine is equally suitable. Not all nitrogen compounds are equally effective in forming complexes which will absorb the desired component. For example, the beta-picoline complex with nickel thiocyanate is not as effective as the gamma-picoline complex for absorbing para-xylene, presumably because of the steric effects of the 3-methyl group. However, the beta-picoline complex may be used advantageously for absorbing other compounds. Also a mixture of beta- and gamma-picoline may be employed to form a mixed-crystal form of Werner complex which is suitable for absorbing p-xylene. The nitrogen compounds should therefore be selected by a judicious combination of theoretical reasoning and actual testing of the complexes with the particular mixture to be separated. The over-all molecular dimensions of the nitrogen compound should approximate the molecular dimensions of the compound to be absorbed in the complex. Suitable nitrogen compounds for various applications include for example, mono-, di- and trialkyl amines, arylamines, mono- and di-N-substituted arylamines, amino-naphthenes; heterocyclic amines such as pyridine, substituted pyridines, quinolines, pyrroles, piperidines, all of which contain a basic nitrogen atom in the ring; polyamines such as ethylene diamine, and amines containing other non-interfering functional groups. The heterocyclic amines are a preferred class, and especially the 4-substituted pyridines such as the 4-alkyl-pyridines, 4-hydroxy-pyridine, 4-chloro-pyridine, 4-chloromethyl-pyridine, 4-amino-pyridine, etc.

The Werner complexes defined by Formula 1 above may be prepared by any of several different methods. According to one method the complex may be formed by precipitation from an aqueous solution. This is ordinarily accomplished by first forming in solution the desired metal salt containing the X and A components of Formula 1. To this solution is then added from about two to six molar equivalents of the desired nitrogen compound Z. The insoluble complex thereupon precipitates and is removed and dried. The drying may be accomplished in a stream of air at room temperature, or slightly elevated temperatures may be employed. The substantially dry, powdered or granular complex may then be employed directly in the separation techniques described herein.

Examples of suitable specific complexes which may be employed herein are as follows:

[Ni(γ picoline)4(SCN)2]
[Cu(γ picoline)4(SCN)2]
[Hg(γ picoline)4(NNN)2]
[Ni(1-hexylamine)6(SCN)2]
[Co(pyridine)4(OCN)2]
[Zn(γ picoline)2Cl2]
[Fe(imidazole)4(SCN)2]
[Fe(pyrrole)4(SCN)2]
[Cd(γ picoline)4(CN)2]
[Zn(aniline)4(SCN)2]
[Ag(γ picoline)2(NNN)]
[Zn(aniline)4(CN)2]
[Cr(pyridine)4SO4]
[Fe(1-hexylamine)4(SCN)2]
[Ti(isoquinoline)3(NH3)3(C2O4)2]
[Ni(4-ethylpyridine)4(NO2)2]

Obviously many other complexes similar to the above could be employed, not all of which would give effective or optimum separation of all isomer pairs, but which should be selected to meet the specific peculiarities of the isomers concerned.

The reasons for the advantages gained herein by employing an excess of nitrogen base over the stoichiometric ratios indicated in the above formulae are not understood with certainty. However, as indicated above, certain metal salts may be capable of forming complexes with different molar proportions of nitrogen base, as for example [Ni(γ picoline)4(SCN)2] and [Ni(γ picoline)2(SCN)2]. These different complexes may exist in equilibrium with each other. Such a possibility may be exemplified by the following generalized equation:

$$X \cdot Z_4 \cdot A \rightleftharpoons X \cdot Z_2 \cdot A + 2Z$$

where X, Z, and A designate respectively, metal, nitrogen base and anion. Introducing an excess of Z therefore shifts the equilibrium to the left, forming more $X \cdot Z_4 \cdot A$, which is postulated to be the active complex in the present case. Apparently the complexes containing only two molar proportions of nitrogen base are not as effective as clathrate-formers as are those which contain four or six moles. This is however a hypothetical explanation, and the invention is not limited thereto, but to the actual procedures described.

The amount of complex employed, relative to the feed mixture, depends upon its specific capacity for absorbing the particular isomer concerned, and also upon the proportion of that isomer present in the original mixture. The complexes are found in general to be capable of absorbing between about 5% and 70% by weight of absorbable compounds. Optimum efficiency may require that more or less than this "stoichiometric" amount of complex be employed, depending upon its relative capacity for other components in the mixture to be resolved, and the number of clathration stages which are permissible. In general, the amount of complex to be employed may vary between about 0.25 and 20 parts by weight per part of clathratable component in the mixture. Smaller proportions of complex will generally yield a purer absorbate, while the larger proportions result in more complete removal of absorbate from the mixture, on the basis of a single-stage batch absorption.

The amount of excess nitrogen base employed may vary widely. Any increment over the stoichiometric amount required to yield the desired complex is beneficial. Suitable proportions may range between about .01 and 10 parts per part of complex by weight, and preferably between about 0.1 and 0.6 part per part of complex. The optimum proportion will vary somewhat for each particular complex, and for the particular clathration procedure employed. In each case however, the optimum proportion may be easily determined by simply measuring the clathrating capacity of a graduated series of mixtures containing varying proportions of nitrogen base, and interpolating or extrapolating to define the optimum mixture, i. e. the one which will clathrate the largest weight-ratio of the particular feed component.

The procedural steps involved herein may be briefly summarized as follows:

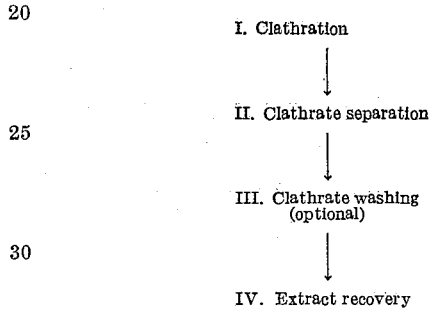

I. Clathration

II. Clathrate separation

III. Clathrate washing (optional)

IV. Extract recovery

The first step in the process, indicated at I above, is designated "clathration." This step involves essentially a contacting of the feed mixture to be separated with the particular Werner complex which is to be employed, in the presence of the excess nitrogen base. This contacting may be performed by either of two general methods.

The first method consists in merely contacting and agitating the dry, solid Werner complex with the liquid mixture of feed plus excess nitrogen base, whereupon the clathratable components of the feed mixture are absorbed into the solid complex, forming the clathrate. Any suitable temperature may be maintained during clathration, e. g. from −50° to +150° C. Preferably room temperatures are employed. In this method, it may be desirable in some cases to dilute the liquid components with a thinner which is not a solvent for the Werner complex in order to facilitate the agitation and handleability of the resulting slurry. Hydrocarbon thinners are preferred for this purpose. In other cases the feed mixtures may be sufficiently lean in the component which is to be absorbed in clathrate form that an extraneous thinner is unnecessary. In still other cases, sufficient excess nitrogen base may be employed to act as a thinner. In any case it is usually desirable that sufficient fluid be present to form a slurry which may be easily stirred, as with a propeller, or in a colloid mill. If no thinner is employed, the solid clathrate which is filtered or otherwise separated from the lean feed residue will contain an interstitial phase composed primarily of lean feed residue plus excess nitrogen base. If a thinner is employed, the interstitial phase will consist of thinner, lean feed residue and nitrogen base.

The second general method for performing the clathration step consists in dissolving the Werner complex in a solvent such as propylene glycol, methyl Cellosolve, or chloroform, adding the excess nitrogen base and the feed mixture, and then altering the physical environment of the resulting solution, as by cooling, in such manner as to precipitate the Werner complex. The dissolving step may be performed at elevated temperatures e. g. 50°–200° C., and the precipitation may be accomplished by cooling to e. g. 0°–40° C. Any differential set of temperatures may be employed. In precipitating, the complex selectively absorbs one or more components of the feed mixture, thereby forming a clathrate. As recovered by filtration or centrifuging, the clathrate contains an interstitial phase consisting of solvent plus lean feeding mixture and nitrogen base.

The separation step II may be performed in any suitable manner, as by filtration, centrifuging, decantation, or by liquid-liquid phase separation wherein the solid clathrate is either suspended or dissolved in one of the phases. In any case, the separated liquid raffinate contains most of the excess nitrogen base employed. This raffinate is then treated by conventional separation procedures, e. g. distillation, azeotropic distillation, solvent extraction, etc., to resolve it into the separate fractions, nitrogen base, lean feed, and solvent or thinner as the case may be. The nitrogen base and the solvent or thinner fractions are then recycled to the clathration step. Actually it is not necessary to separate the nitrogen base from the solvent or thinner; both components may be recovered as a single fraction and recycled. The lean feed fraction may be disposed of in any desired manner, or may be treated in further clathration stages to recover any remaining clathratable components therein.

The separated clathrate from step II contains an absorbed phase, or extract, relatively rich in clathratable components. As indicated above, it also contains an interstitial phase composed of solvent or thinner, lean feed residue and excess nitrogen base. The washing step indicated at III is designed primarily for removing the interstitial phase. This step may be omitted if desired, but to obtain maximum purity, i. e. to reduce the proportion of relatively non-clathratable components in the extract to a minimum, it is preferable to remove the interstitial phase before recovering the extract. The washing step III is intended to include broadly any method for removing the interstitial phase. Such methods include for example steam-stripping, vapor-stripping, or washing with a solvent which is more readily separable from the clathrated phase than was the original interstitial phase. Suitable solvents include for example paraffinic hydrocarbon fractions in the pentane to heptane range. The interstitial phase, as recovered by washing or stripping, may then be treated along with the above described raffinate, or separately, to recover the nitrogen-base, lean feed and solvent or thinner fractions.

The washed clathrate is then subjected to treatment for recovery of the clathrated phase, or "extract" in step IV. Several methods may be employed for recovering the extract. One method consists of steam or vapor-stripping. The extract may also be recovered by simply destroying the Werner complex, as by treatment with acid. It is ordinarily preferable however to recover the complex in a form suitable for recycling to step I of the process. Another method for recovering the extract consists in dissolving the clathrate in a solvent, preferably a high-boiling solvent such as ethylene glycol, diethylene glycol, methyl Cellosolve, butyl Cellosolve, propylene glycol, butylene glycol, glycerol ethers, etc., and then distilling the solution to recover the extract which is liberated from the clathrate. In this latter method the extract may be recovered in substantially pure form, or as an azeotrope with the solvent. After recovery of the extract the solid complex is ordinarily recovered by cooling the solvent. In most cases additional feed mixture and recycle nitrogen base may be added before the complex is precipitated, thereby again forming a clathrate with the clathratable components of the feed mixture. Any other suitable method for recovering the extract from the clathrate may be employed.

A wide variety of compounds may be separated by the methods described above. Mixtures of hydrocarbon isomers, as well as mixtures of their isomeric functional derivatives, may be employed. The Werner complexes employed herein are found to favor, for the most part, the absorption of para compounds over the ortho- or meta-isomers, and relatively branched-chain aliphatics as opposed to relatively straight-chain aliphatics of the same or similar molecular weight. However, by suitably modifying the constituents of the complex employed, this order may be reversed so that meta- and ortho-compounds may be selectively absorbed in preference to the para-isomers, and straight-chain aliphatics in preference to branched-chain.

The methods described herein are particularly adapted for the resolution of close-boiling mixtures of aromatic hydrocarbon isomers such as may occur in petroleum fractions, and especially those petroleum fractions which result from catalytic reforming operations such as hydroforming, platforming, etc. For example, there may be obtained from such reformates a particularly refractory cut boiling between about 138–145° C., and consisting essentially of the C-8 aromatic hydrocarbons, ethylbenzene, o-, m- and p-xylene in varying proportions. By close fractionation, it is ordinarily possible to separate out the ethylbenzene and o-xylene, but the meta- and para-xylenes are almost impossible to separate by fractional distillation since the former boils at 139.1° C. and the latter at 138.3° C. By the methods described herein para-xylene may be obtained essentially free of meta-xylene and vice versa. The ortho-xylene remains in the unabsorbed phase with the meta-isomer and part of the ethylbenzene. The para-xylene and part of the ethylbenzene are absorbed into the complex as the clathrated phase. Each of these phases, when recovered, may be further resolved if desired by conventional methods such as fractional crystallization or fractional distillation to obtain the pure individual isomers. In general the aromatic para-isomers may be separated from the ortho- and meta-isomers. It is not essential, however, that the feed mixture consist of isomers; the methods herein described may be applied to any mixtures of close-boiling hydrocarbons which are difficultly separable by conventional methods, particularly aromatic hydrocarbons. For example p-xylene may be selectively absorbed from any mixture of difficultly separable hydrocarbons, which mixture may also include aliphatic or naphthenic hydrocarbons.

In addition to hydrocarbons, difficultly separable functional derivatives containing nitro, amino, halogen, hydroxyl, oxo, carbonyl, thio or mercapto groups for example may generally be separated from each other by the present methods. Examples of mixtures which may be separated include the following, some of which are isomeric and some of which are not:

m-Cresol
p-Cresol 1,1-dichloro ethane
1,2-dichloro ethane

Cyclohexane
n-Heptane m-Chlorotoluene
Benzyl chloride

Ethylbenzene
3-methyl octane o-Phthalic acid
p-Phthalic acid m-Phthalic acid
p-Phthalic acid 2-pentanol
3-methyl-2-butanol m-Toluidine
p-Toluidine p-Ethyl toluene
m-Ethyl toluene p-Cymene
m-Cymene In order to further illustrate the invention the following operational examples are cited, which should be considered as illustrative only and not limitative:

Example I

Ten ml. of gamma-picoline, 40 ml. of methyl Cellosolve and 20 gms. of nickel tetra-gamma-picolino dithiocyanate, [Ni($\gamma$-picoline)$_4$(SCN)$_2$] are placed in a beaker and heated until complete solution is effected at 112° C. To the hot, clear solution is added 11.5 ml. of a feed mixture consisting of C-8 aromatic hydrocarbons. The hot solution is then cooled to 30° C., forming a blue, crystalline clathrate phase which is separated by filtration. The solid phase and the filtrate are treated separately with dilute HCl, and the hydrocarbon phase formed in each case is recovered. The composition of feed and recovered hydrocarbons is as follows:

| Sample | Composition of Sample, Vol. Percent | | | | Yield [a] |
|---|---|---|---|---|---|
| | p-xylene | m-xylene | o-xylene | Et. Bz. | |
| Feed | 19.4 | 46.2 | 18.4 | 16.0 | |
| Extract | 50.0 | 24.6 | 8.2 | 17.2 | 73.5 |
| Raffinate | 4.9 | 56.8 | 23.6 | 14.7 | 12.3 |

[a] Vol. percent p-xylene introduced as feed recovered in the respective phase.

When the above procedure is repeated omitting the excess gamma-picoline, the solubility of the nickel tetra-gamma-picolino dithiocyanate in the methyl Cellosolve is observed to be incomplete, and the yield of p-xylene recovered in the extract phase is below 30%. This example shows clearly the beneficial effect on capacity and solubility of the complex obtained by employing an excess of nitrogen base in conjunction with a Cellosolve solvent. Substantially the same effect is obtained with other solvents such as propylene glycol, diethylene glycol, etc.

Example II

Six grams of gamma-picoline, 54 gms. of methyl Cellosolve and 30 gms. of nickel tetra-gamma-picolino dithiocyanate, [Ni($\gamma$-picoline)$_4$(SCN)$_2$] are placed in a beaker and heated until complete solution is effected at 120° C. To the hot, clear solution is added 20 ml. of a feed mixture consisting of mixed ethyltoluenes. The hot solution is then cooled to 30° C., and the precipitated solid clathrate is removed by filtration. The solid phase and the filtrate are treated separately with dilute HCl, and the hydrocarbon phase formed in each case is recovered. The composition of feed and recovered hydrocarbons is as follows:

| Sample | Composition of Sample, Vol. Percent | | | Yield |
|---|---|---|---|---|
| | p-Et. toluene | m-Et. toluene | o-Et. toluene | |
| Feed | 33.4 | 47.3 | 19.3 | |
| Extract | 58.4 | 32.1 | 17.3 | 24 |
| Raffinate | 28.2 | 51.6 | 20.2 | |

When the above procedure is repeated omitting the excess gamma-picoline, the solubility of the complex in the solvent is incomplete at the stated temperature, and the yield of p-ethyl-toluene in the extract phase is less than about 10%. This example also illustrates the beneficial effect on solubility and clathrating capacity of the complex when an excess of nitrogen base is employed. Substantially the same results are obtained when nickel tetra-4-ethylpyridino dithiocyanate or manganous tetra-4-ethylpyridino dithiocyanate is substituted for the above gamma-picoline complex, and when excess 4-ethylpyridine is employed instead of excess gamma-picoline.

Example III

The procedure of Example II is repeated using as feed 18 ml. of a mixture of isomeric cymenes (isopropyl toluenes). The results are as follows:

| Sample | Composition of Sample, Vol. Percent | | | Yield |
|---|---|---|---|---|
| | p-cymene | m-cymene | o-cymene | |
| Feed | 50.0 | 14.7 | 35.3 | |
| Extract | 69.0 | 9.0 | 22.0 | 22 |
| Raffinate | 35.6 | 13.8 | 50.6 | |

By re-clathrating the extract in each of the above examples, a further concentration of the para-isomer is obtained. In most cases, 95–100% pure para-isomer may be obtained in two clathration stages.

Example IV

This example shows the effect of excess nitrogen base in the procedure wherein clathration is accomplished by simply contacting the undissolved solid complex with the feed mixture. The complex employed is nickel tetra-gamma-picolino dithiocyanate, prepared as follows:

A solution is formed by dissolving 205 gms. of gamma-picoline (2.2 moles) in 500 gms. of water. To this solution is added slowly at room temperature with stirring a solution of 119 gms. NiCl$_2 \cdot$6H$_2$O (0.5 mole) and 76.1 gms. NH$_4$SCN (1.0 mole) in 500 ml. of water. The resulting slurry is filtered and the precipitate is reslurried with 1 liter of water containing 50 gms. of gamma-picoline. The second slurry is filtered and the precipitate is air dried for 67 hours, to give 276 gms. (0.505 mole) of [Ni(gamma-picoline)$_4$(SCN)$_2$].

In four separate runs, A, B, C and D, the above Werner complex is employed to clathrate mixed feed xylenes by agitating the xylenes, the solid complex, excess gamma-picoline, and a kerosene thinner for 90 minutes at room temperature. The four runs differ only in the proportion of excess excess gamma-picoline present during clathration. In each run 40 gms. of complex, 20 gms. of feed xylenes and 67 gms. of kerosene are employed. In runs A, B, C and D, the excess gamma-picoline was 0, 4.0, 8.0 and 12 gms., respectively. After agitating for the stated period of time, the slurries are filtered, and the hydrocarbons are recovered from each phase as outlined in the previous examples. The xylene content of the aromatic fractions of the feed and the recovered hydrocarbon phases are as follows:

| Sample | Wt. ratio, $\gamma$-picoline complex | Composition of sample, vol. percent | | | | p-xylene yield |
|---|---|---|---|---|---|---|
| | | p-xylene | m-xylene | o-xylene | Et. Bz. | |
| Feed | | 19.4 | 46.2 | 18.4 | 16.0 | |
| Extract A | 0.0 | 62.7 | 15.4 | 6.3 | 15.6 | 39 |
| Raffinate A | | 12.6 | 51.5 | 20.4 | 15.5 | |
| Extract B | 0.1 | 58.1 | 19.8 | 4.3 | 17.8 | 55 |
| Raffinate B | | 10.1 | 53.7 | 20.7 | 15.5 | |
| Extract C | 0.2 | 71.6 | 6.8 | 1.1 | 20.5 | 69 |
| Raffinate C | | 7.3 | 53.3 | 23.5 | 15.9 | |
| Extract D | 0.3 | 71.4 | 7.0 | 1.3 | 20.3 | 66 |
| Raffinate D | | 8.2 | 53.9 | 23.6 | 14.3 | |

This example shows that the use of excess gamma-picoline favorably affects both purity and percent recovery of p-xylene in the clathration procedure.

While the above examples are necessarily limited to specific materials, it is to be understood that substantially the same beneficial results are obtained when other complexes, other feed mixtures and other solvents or thinners as herein disclosed are employed. The invention should therefore not be considered as limited to the specific disclosure, since many variations may be made by those skilled in the art without departing from the scope or spirit of the following claims:

We claim:
1. A process for resolving a mixture of aromatic hydrocarbons differing in molecular configuration which comprises contacting said mixture with a solid Werner complex, said Werner complex being composed of a metal salt cordinated with four moles of a heterocyclic nitrogen base containing a basic hetero-N atom, said contacting being effected in the presence of a stoichiometric excess of heterocyclic nitrogen base, whereby at least one of the hydrocarbons in said mixture is selectively absorbed into the crystal structure of said complex, and recovering the absorbed component from said complex.

2. A process according to claim 1 wherein said aromatic hydrocarbons consist essentially of alkyl aromatic hydrocarbons including a para-isomer and at least one member selected from the group consisting of ortho-isomers, meta isomers and monoalkyl aromatic isomers.

3. A process as defined in claim 1 wherein said metal salt is selected from the class consisting of the cyanides, thiocyanates, isothiocyanates, azides, cyanates, isocyanates and nitrites of metals having an atomic number above 12.

4. A process for resolving a mixture of aromatic hydrocarbons differing in molecular configuration which comprises contacting said mixture with a solid Werner complex, said Werner complex being composed of a metal salt coordinated with substantially 4 moles of a 4-substituted pyridine, said contacting being effected in the presence of a stoichiometric excess of 4-substituted pyridine, whereby at least one of the hydrocarbons in said mixture is selectively absorbed into the crystal structure of said complex, and recovering the absorbed component from said complex.

5. A process according to claim 4 wherein said stoichiometric excess of 4-substituted pyridine amounts to between about 0.1 and 0.6 parts by weight per part of said complex.

6. A process as defined in claim 4 wherein said excess 4-substituted pyridine and the 4-substituted pyridine in said Werner complex are identical compounds.

7. A process as defined in claim 4 wherein said aromatic hydrocarbons comprise para-xylene and at least one member selected from the group consisting of ortho-xylene, meta-xylene, and ethylbenzene, and said metal salt is a thiocyanate of a metal having an atomic number above 12.

8. A process according to claim 7 wherein said metal is nickel.

9. A process according to claim 7 wherein said metal is manganese.

10. A process according to claim 7 wherein said metal is iron.

11. A process according to claim 7 wherein said metal is cobalt.

12. In a process for resolving a mixture of aromatic compounds differing in molecular configuration by contacting said mixture with a solid Werner complex to effect selective clathration, said Werner complex being composed of a metal salt coordinated with four moles of a heterocyclic nitrogen base containing a basic hetero-N atom, the improvement which comprises effecting said contacting in the presence of a stoichiometric excess of heterocyclic nitrogen base whereby at least one of the compounds in said mixture is selectively absorbed into the crystal structure of said complex to a greater extent than would occur in the absence of said excess of nitrogen base, and recovering the absorbed component from said complex.

13. A process as defined in claim 12 wherein said tromatic compounds consist essentially of substituted benzene isomers including a para-isomer and at least one member selected from the group consisting of an ortho-isomer, a meta-isomer and a mono-substituted benzene isomer.

14. A process for resolving a feed mixture comprising aromatic hydrocarbons differing in molecular configuration which comprises dissolving said feed mixture and a solid Werner complex in a mutual solvent for those materials, said Werner complex being composed of a metal salt coordinated with four moles of a 4-substituted pyridine, providing in the resulting solution a stoichiometric excess of 4-substituted pyridine, cooling the resulting solution to precipitate a clathrate of said Werner complex with at least one component of said feed mixture, and recovering the absorbed component from said clathrate.

15. A process as defined in claim 14 wherein said feed mixture comprises at least two xylene isomers.

16. A process for resolving a mixture of aromatic hydrocarbons differing in molecular configuration which comprises contacting and agitating said mixture with a solid, granular Werner complex in the presence of an inert thinner in which said Werner complex is substantially insoluble, said Werner complex being composed of a metal salt coordinated with four moles of a heterocyclic nitrogen base containing a basic hetero-N atom, said contacting being effected in the presence of a stoichiometric excess of heterocyclic nitrogen base, whereby at least one of said aromatic hydrocarbons is selectively absorbed into the crystal structure of said complex in preference to another of said hydrocarbons, and recovering the absorbed hydrocarbon from said complex.

17. A process as defined in claim 16 wherein said aromatic hydrocarbons comprise at least two xylene isomers.

References Cited in the file of this patent
UNITED STATES PATENTS
2,596,344    Newey et al. _____ May 13, 1952

OTHER REFERENCES

Hal'pern: Bull. Acad. Sci., U. R. S. S., Classe Sci. math. not., Ser. chim., 1937, pages 435–441. Abstracted in Chem. Abs., vol. 31, page 7350 (1937).

Price et al.: Proc. Roy. Soc. (London), vol. A191, pages 22–31 (1947). Abstracted in Chem. Abs., vol. 42, page 1504 (1948).

Powell: Jour. Chem. Soc. (London) (1948), pages 61–73 (13 pages).

Powell: Nature, vol. 163, pages 566 and 567 (1949).

Evans et al.: Jour. Chem. Soc. (London) (1950), page 3346.

Smith: Jour. Chem. Phys., vol. 18 (1950), pages 150–151.

Rayner et al.: Jour. Chem. Soc. (London) (1952) (February), pages 319–328.